US011847731B2

(12) United States Patent
Li et al.

(10) Patent No.: US 11,847,731 B2
(45) Date of Patent: *Dec. 19, 2023

(54) INTERACTIVE EDITING OF VIRTUAL THREE-DIMENSIONAL SCENES

(71) Applicant: DISNEY ENTERPRISES, INC., Burbank, CA (US)

(72) Inventors: Yining Karl Li, Burbank, CA (US); Mark Lee, Valencia, CA (US); Daniel Teece, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,534

(22) Filed: Nov. 3, 2022

(65) Prior Publication Data
US 2023/0132754 A1 May 4, 2023

Related U.S. Application Data

(63) Continuation of application No. 16/736,753, filed on Jan. 7, 2020, now Pat. No. 11,494,966.

(51) Int. Cl.
*G06T 15/06* (2011.01)
*G06T 15/00* (2011.01)

(52) U.S. Cl.
CPC ............ *G06T 15/005* (2013.01); *G06T 15/06* (2013.01); *G06T 2200/24* (2013.01)

(58) Field of Classification Search
CPC .... G06T 15/005; G06T 15/06; G06T 2200/24
See application file for complete search history.

(56) References Cited

U.S. PATENT DOCUMENTS

| 6,091,422 A | 7/2000 | Ouaknine et al. |
| 9,245,377 B1 | 1/2016 | Jarosz et al. |
| 2011/0032257 A1 | 2/2011 | Peterson et al. |

(Continued)

FOREIGN PATENT DOCUMENTS

EP  3 511 908 A1  7/2019

OTHER PUBLICATIONS

Kan et al., "Differential Progressive Path Tracing for High-Quality Previsualization and Relighting in Augmented Reality", Lecture Notes in Computer Science, XP047043461, ISBN: 978-3-642-1 7318-9, vol. 8034, Chap. 32, No. 558, Jul. 29, 2013, pp. 328-338.

(Continued)

*Primary Examiner* — Jitesh Patel
(74) *Attorney, Agent, or Firm* — Artegis Law Group, LLP

(57) ABSTRACT

Techniques are disclosed for interactive editing of virtual three-dimensional scenes. In the disclosed techniques, rendering is divided into (1) an interactive phase during which a user interactively edits a virtual scene while preview image frames are rendered using a modified ray tracing technique, and (2) a refinement phase during which full ray tracing is performed to show the user a final rendered image frame. The modified ray tracing technique may limit the number of bounces of light rays and/or the computations performed at each bounce, thereby reducing computational expense relative to a full ray tracing technique. Further, the modified ray tracing technique may be user-selectable and associated with a particular department within an animation studio.

20 Claims, 7 Drawing Sheets

(56) References Cited

U.S. PATENT DOCUMENTS

| | | |
|---|---|---|
| 2011/0238680 A1 | 9/2011 | Chhugani et al. |
| 2012/0213430 A1 | 8/2012 | Nutter et al. |
| 2015/0294511 A1 | 10/2015 | Nishioka et al. |
| 2016/0314614 A1* | 10/2016 | Bitterli .................. G06T 15/55 |
| 2018/0061117 A1* | 3/2018 | Pohl ...................... G06T 3/0012 |
| 2019/0236834 A1* | 8/2019 | Blackmon ............... G06T 15/06 |
| 2019/0340306 A1 | 11/2019 | Harrison et al. |
| 2020/0159936 A1 | 5/2020 | Anderson et al. |

OTHER PUBLICATIONS

Bittner et al., "Incremental BVH Construction for Ray Tracing", Computers & Graphics, XP055670178, ISSN: 0097-8493, DOI: 10.1016/j.cag.2014.12.001, vol. 47, Apr. 1, 2015, pp. 135-144.

Streicher, Kevin, "Interactive Scene Manipulation Techniques for Ray Tracing", Bachelorthesis zur Erlangungdes akademischen Grades, Medieninformatik und Visual Computing, XP055806401, doi=10.1.1.390.4546, Jan. 1, 2013, 39 pages.

Bala et al., "Interactive Ray-Traced Scene Editing Using Ray Segment Trees", In The Tenth Eurographics Workshop on Rendering, XP055581125, ISSN: 0946-2767, DOI: 10.1007/978-3-7091-6809-7, Jun. 4, 1999, pp. 31-44.

\* cited by examiner

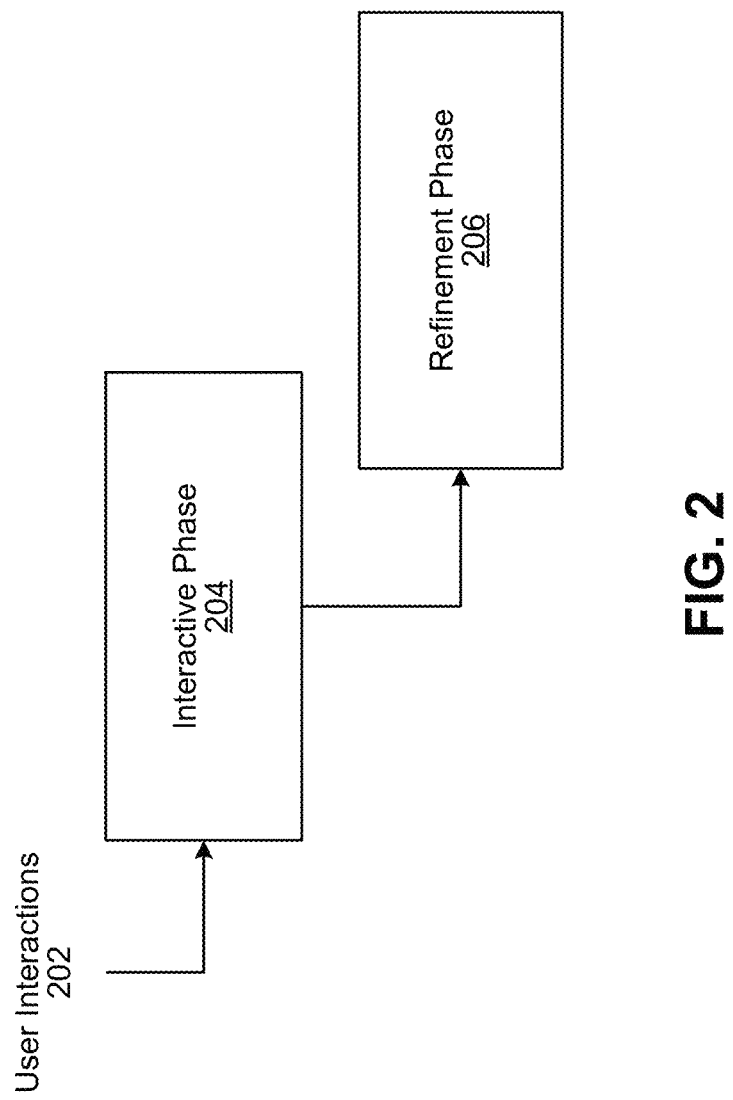

INTERACTIVE EDITING OF VIRTUAL THREE-DIMENSIONAL SCENES

CROSS-REFERENCE TO RELATED APPLICATIONS

This application is a continuation of the co-pending U.S. patent application titled, "INTERACTIVE EDITING OF VIRTUAL THREE-DIMENSIONAL SCENES," filed on Jan. 7, 2020, and having Ser. No. 16/736,753. The subject matter of the related application is hereby incorporated herein by reference.

BACKGROUND

Technical Field

Embodiments of the present disclosure relate generally to three-dimensional (3D) computer graphics and, more specifically, to techniques for interactively editing virtual 3D scenes.

Description of the Related Art

Ray tracing techniques render high-quality, virtual three-dimensional (3D) scenes (also referred to herein as "virtual scenes") by tracing the path of light rays throughout the scenes and simulating the effects produced when the light rays encounter virtual objects within the virtual scenes. Although ray tracing techniques can be used to create high-fidelity, photorealistic image frames, as a general matter, ray tracing techniques are computationally quite expensive. For example, a single frame of a production-scale animated film can take several hours to render using ray tracing techniques. The long rendering times required by ray tracing is at odds with the desire of artists to edit virtual scenes and receive more immediate feedback regarding the effects their edits have on rendered image frames. That is, there is a disconnect between the rendering times required by ray tracing techniques and the desire of artists to have some level of interactivity while creating image frames.

One conventional approach for achieving more interactive feedback when artists create image frames involves implementing rasterization-based rendering techniques to render virtual scenes. Rasterization techniques are faster than ray tracing techniques but can only approximate the results of ray tracing. For example, rasterization techniques typically render image frames that have non-final quality geometry, have simplified shading, have inaccurate reflections, lack physically accurate global illumination, and lack soft shadows. As a result, rasterization techniques provide, at best, inaccurate previews of what image frames rendered via ray tracing would look like, which cannot always be relied upon by artists when making various artistic decisions. In addition, rasterization techniques usually do not scale well. Therefore, for large scale production scenes, the interactive nature afforded by rasterization techniques tends to break down, resulting in more sluggish user experiences.

Another conventional approach for achieving more interactive feedback when artists create image frames involves implementing progressive rendering to render virtual scenes, where full recursive ray tracing is performed using a sparse sampling of the image plane. With this approach, sparse samples can be displayed, or they can be extrapolated, resulting in image frames which are blocky at first, but become more refined over time. However, progressive rendering typically implements full ray tracing, which can be orders of magnitude slower than the rasterization techniques discussed above. Further, due to the sparse or blocky nature of image frames produced by progressive rendering, geometric outlines of objects can be unclear in such image frames, which can hamper layout and animation workflows that require artists to be able to see the geometric outlines of objects within image frames.

As the foregoing illustrates, what is needed in the art are more effective techniques for creating virtual scenes.

SUMMARY

One embodiment of the present application sets forth a computer-implemented method for creating a rendered image frame. The method includes determining one or more user interactions with a virtual scene. The method further includes rendering the virtual scene via a first ray tracing technique, where the first ray tracing technique is applied to the virtual scene based on the one or more user interactions. In addition, the method includes, after rendering the virtual scene via the first ray tracing technique, rendering the virtual scene via a second ray tracing technique.

Other embodiments of the present disclosure include, without limitation, a computer-readable medium including instructions for performing one or more aspects of the disclosed techniques, as well as a computer system for performing one or more aspects of the disclosed techniques.

At least one technical advantage of the disclosed techniques relative to the prior art is that the disclosed techniques enable a user to select various modifications to a ray tracing technique in order to reduce overall rendering times while maintaining visual quality with respect to aspects of the rendered image frames most relevant to the user. Further, the rendering process is divided into an interactive phase that allows users to interactively edit virtual scenes using various modified ray tracing techniques and a refinement phase that implements full ray tracing to provide full quality image frames. During the interactive phase, preview renderings are generated within a limited amount of time, in contrast to traditional ray tracing techniques that can be quite computationally expensive. Thus, the disclosed techniques provide accurate final-frame results, more interactive workflows, and tighter feedback loops that allow artists to better assess the effects their edits have on rendered image frames compared to prior art approaches. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 illustrates an approach for interactively editing a virtual three-dimensional (3D) scene, according to various embodiments;

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
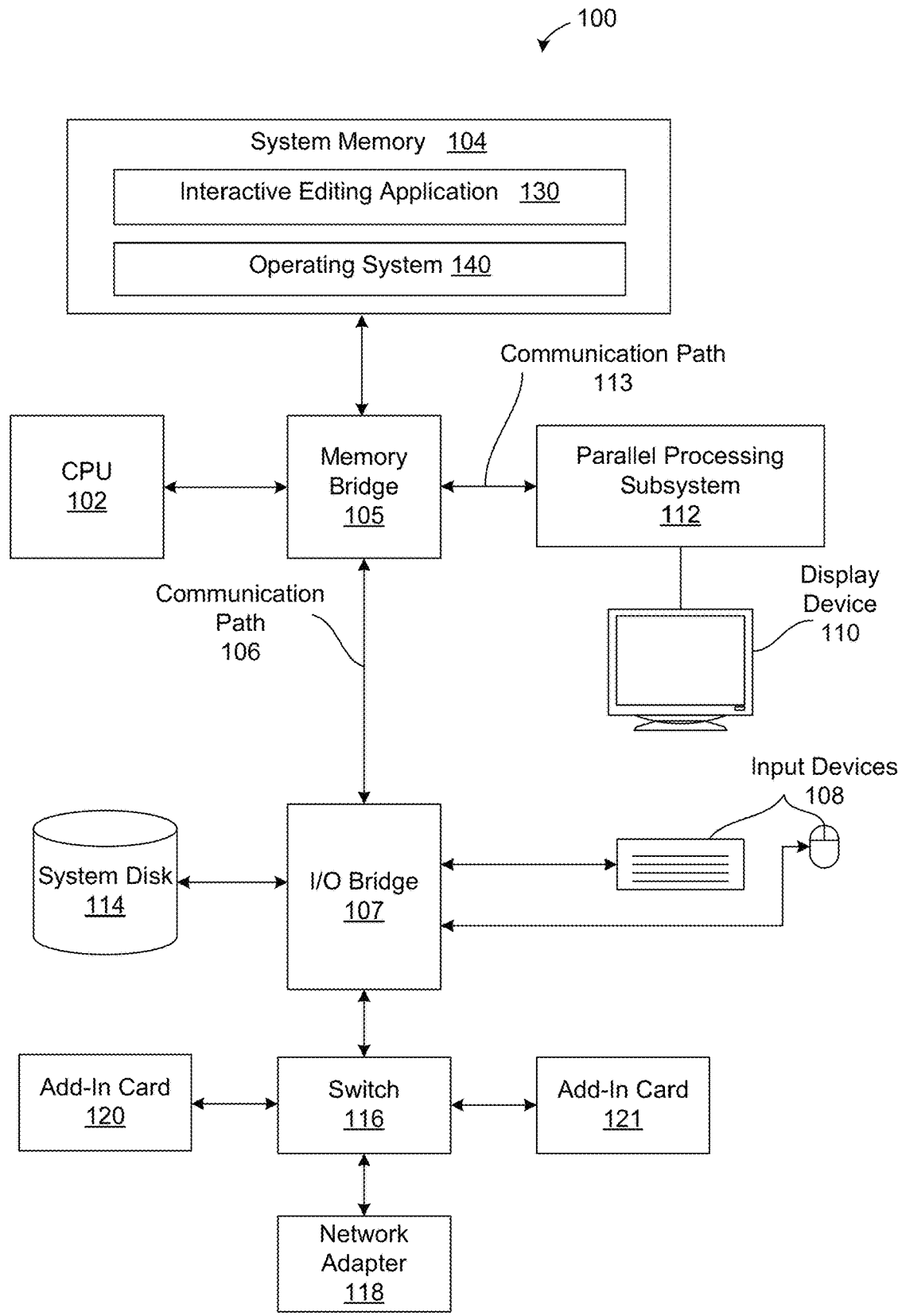
FIG. 1 illustrates a system configured to implement one or more aspects of the various embodiments.

FIG. 1 illustrates a system 100 configured to implement one or more aspects of the various embodiments. As shown, the system 100 includes, without limitation, a central processing unit (CPU) 102 and a system memory 104 coupled to a parallel processing subsystem 112 via a memory bridge 105 and a communication path 113. The memory bridge 105 is further coupled to an I/O (input/output) bridge 107 via a communication path 106, and the I/O bridge 107 is, in turn, coupled to a switch 116.

In operation, the I/O bridge 107 is configured to receive user input information from one or more input devices 108, such as a keyboard, a mouse, a joystick, etc., and forward the input information to the CPU 102 for processing via the communication path 106 and the memory bridge 105. The switch 116 is configured to provide connections between the I/O bridge 107 and other components of the system 100, such as a network adapter 118 and various add-in cards 120 and 121. Although two add-in cards 120 and 121 are illustrated, in some embodiments, the system 100 may only include a single add-in card.

As also shown, the I/O bridge 107 is coupled to a system disk 114 that may be configured to store content, applications, and data for use by CPU 102 and parallel processing subsystem 112. As a general matter, the system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 107 as well.

In various embodiments, the memory bridge 105 may be a Northbridge chip, and the I/O bridge 107 may be a Southbridge chip. In addition, communication paths 106 and 113, as well as other communication paths within the system 100, may be implemented using any technically suitable protocols, including, without limitation, AGP (Accelerated Graphics Port), HyperTransport, or any other bus or point-to-point communication protocol known in the art.

In some embodiments, the parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within the parallel processing subsystem 112. In other embodiments, the parallel processing subsystem 112 incorporates circuitry optimized for general purpose and/or compute processing. Again, such circuitry may be incorporated across one or more PPUs included within the parallel processing subsystem 112 that are configured to perform such general purpose and/or compute operations. In yet other embodiments, the one or more PPUs included within the parallel processing subsystem 112 may be configured to perform graphics processing, general purpose processing, and compute processing operations. The system memory 104 may include at least one device driver configured to manage the processing operations of the one or more PPUs within the parallel processing subsystem 112.

In various embodiments, the parallel processing subsystem 112 may be or include a graphics processing unit (GPU). In some embodiments, the parallel processing subsystem 112 may be integrated with one or more of the other elements of FIG. 1 to form a single system. For example, the parallel processing subsystem 112 may be integrated with the CPU 102 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 104 could be connected to the CPU 102 directly rather than through the memory bridge 105, and other devices would communicate with the system memory 104 via the memory bridge 105 and the CPU 102. In other alternative topologies, the parallel processing subsystem 112 may be connected to the I/O bridge 107 or directly to the CPU 102, rather than to the memory bridge 105. In still other embodiments, the I/O bridge 107 and the memory bridge 105 may be integrated into a single chip instead of existing as one or more discrete devices. In some embodiments, any combination of the CPU 102, the parallel processing subsystem 112, and the system memory 104 may be replaced with any type of virtual computing system, distributed computing system, or cloud computing environment, such as a public cloud, a private cloud, or a hybrid cloud. Lastly, in certain embodiments, one or more components shown in FIG. 1 may not be present. For example, the switch 116 could be eliminated, and the network adapter 118 and add-in cards 120, 121 would connect directly to the I/O bridge 107.

Illustratively, the system memory 104 stores an interactive editing application 130 and an operating system 140 on which the interactive editing application 130 runs. The operating system 140 may be, e.g., Linux®, Microsoft Windows®, or macOS®. In some embodiments, the interactive editing application 130 is configured to render image frames using a modified ray tracing technique that prioritizes speed during an interactive phase, in order to provide interactive feedback to a user interacting with a virtual scene. Although described herein primarily with respect to image frames, some embodiments may also render images that are not image frames, such as an individual image. In addition to the rendering that prioritizes speed during the interactive phase, the interactive editing application 130 is configured to render image frames using a full ray tracing technique during a refinement phase after the user stops interacting with the virtual scene, as discussed in greater detail below.

Interactive Editing of Virtual 3D Scenes

FIG. 2 illustrates an approach for interactively editing a virtual three-dimensional (3D) scene, according to various embodiments. As shown, the interactive editing application 130, described above in conjunction with FIG. 1, receives user interactions 202 with a virtual 3D scene and renders the virtual scene in two phases. While a user is interacting with the virtual scene, the interactive editing application 130 performs a first, interactive phase 204 of rendering, during which fast preview renderings are generated using a modification to a ray tracing technique, in order to show the results of the user interactions. Then, when the user stops interacting with the virtual scene, the interactive editing application 130 enters a second, refinement phase 206, during which a full ray tracing technique is performed to show the user a final, high-quality image frame.

User interactions that trigger the interactive phase 204 of rendering may include selecting, moving, adding, deleting, and/or changing the attributes of one or more objects, light sources, and/or virtual cameras within a virtual scene. The ending of user interaction events, such as when the user de-selects, stops moving, and/or finishes adding, deleting, and/or changing the attributes of objects, light sources, and/or virtual cameras, triggers the refinement phase 206. For example, in response to a user selecting an object, the interactive editing application 130 may perform a modified ray tracing technique in which the selected object is rendered in full, but the geometry of other objects is rendered with basic shading and simple illumination. As used herein, the "geometry" of an object refers to shape(s) associated with the object. Continuing the example, when the user de-selects the object, ending the interaction event, the interactive editing application 130 enters the refinement phase 206 during which full ray tracing is performed to show the user a final, high-quality image frame. As another example, in response to a user selecting a light source, the interactive editing application 130 may perform a modified ray tracing technique in which shadows created by the selected light source are rendered, but shadows created by other light sources are not rendered. Then, when the user de-selects the light source, the interactive editing application 130 again enters the refinement phase 206. Further examples of modified ray tracing techniques are discussed below.

As described, fast preview renderings are generated by the interactive editing application 130 to show the results of user interactions with a virtual scene during the interactive phase 204. In some embodiments, each of the preview renderings is generated within a predefined amount of time. For example, the predefined amount of time could be a fraction of a second, such as $\frac{1}{30}^{th}$ or $\frac{1}{60}^{th}$ of a second. In the predefined amount of time, the interactive editing application 130 guarantees the fidelity of only certain aspects of a rendered image frame that are of interest to a user, such as the geometry, textures, shading, illumination, shadows, and/or volumes in the image frame, as discussed in greater detail below. For example, the interactive editing application 130 could be configured to guarantee geometric fidelity, in which sharp geometric outlines are visible in the rendered image frame, while performing a limited set of computations for textures, shading, illumination, shadows, and/or volumes in a remaining time of the predefined amount of time. Additional and further examples are discussed below.

In general, the fidelity of certain aspects of image frames can be guaranteed, while the image frames are rendered at interactive frame rates, using a modified ray tracing technique that performs only a subset of the operations of a full ray tracing technique, including operations that are necessary to guarantee the fidelity of user-selected aspects of the rendered image frames. As used herein, a subset of the operations of a full ray tracing technique refers to less than all of the ray tracing operations included/performed in the full ray tracing technique. In some embodiments, the modified ray tracing technique performed during the interactive phase 204 may include a subset of the operations of a full ray tracing technique performed during the refinement phase 206. In other embodiments, the modified ray tracing technique performed during the interactive phase 204 may include operations that are not simply a subset of the operations included in a full ray tracing technique performed during the refinement phase 206. For example, a different set of rays could be traced in the modified ray tracing technique performed during the interactive phase 204 for an ambient occlusion visualization of geometry, compared with rays that are traced in a full ray tracing technique performed during the refinement phase 206. In yet further embodiments, the ray tracing technique performed during the refinement phase 206 may itself be a modification of a full ray tracing technique, as discussed in greater detail below.

Using a modified ray tracing technique, the computing power required for the interactive phase 204 can be orders of magnitude less than what is required to fully ray trace a virtual scene. The reduced computing power permits rendering during the interactive phase 204 to be performed within a limited amount of time (e.g., a fraction of a second), which in turn enables users to edit virtual scenes and receive interactive feedback as to the results of their edits, unlike conventional ray tracing techniques.

In some embodiments, in order to identify the aspects of the rendered image frame that are of interest to a user, the interactive editing application 130 permits the user to select among a number of predefined rendering modes, each of which provides a customization of which aspect(s) of the rendered image frame should be preserved and which aspects can be omitted. It should be noted that rendering during the interactive phase 204 does not produce entire image frames, but rather image frames that are simplified in characteristics not critical to the user workflow. In addition, the user may also be permitted to select among a number of options (presented as, e.g., check boxes) within each rendering mode indicating aspect(s) of the rendered image frame that should be preserved and/or omitted. In some embodiments, different rendering modes may be customized for different departments within an animation studio. For example, users in a layout department generally need to see an accurate representation of the detailed geometric form, but may not be concerned about final shading and illumination. In such a case, the users could select a rendering mode that guarantees geometric fidelity, but does not guarantee shading or illumination fidelity. As another example, users in an animation department generally need to see fluid movement and sharp geometry, but may not be concerned with volumes or indirect illumination. As a further example, users in a look development department generally need to see accurate material reflectance, but may not be concerned with the rest of a rendered environment aside from shaders they are working on. As yet another example, users in a lighting department are responsible for placing lights in an unlit scene and need to see the illumination and shadows created by such lights, but may not be concerned with full shading or displaced geometry. In the foregoing cases, users of each department may select a rendering mode and associated options that meet their needs, such as a rendering mode that guarantees geometric fidelity while showing fluid movement of objects within a virtual scene, a mode that guarantees shading and illumination fidelity, etc.

Although described herein primarily with respect to predefined rendering modes and associated options, in other embodiments, the interactive editing application 130 may permit a user to select any of a number of options (presented as, e.g., check boxes, aspects in a list, aspects in a drop-down menu, etc.) for computations to omit and/or retain in a full ray tracing technique. In such cases, modifications to the ray tracing technique are fully customizable by the user, without having to rely on predefined rendering modes.

So long as the user continues interacting with the virtual scene, the interactive editing application 130 remains in the interactive phase 204. The refinement phase 206 begins when the interactive editing application 130 determines that the user has stopped interacting with the virtual scene. In some embodiments, the refinement phase 206 includes performing a full ray tracing technique that converges to the final rendered image frame. Such a full ray tracing technique is more computationally expensive than the modified ray tracing technique performed during the interactive phase 204. However, the full ray tracing technique permits the user to see a final rendered image frame.

Although described herein primarily with respect to performing full ray tracing during the refinement phase 206, in some embodiments, a modified ray tracing technique may be performed during the refinement phase 206 that is less computationally expensive than a full ray tracing technique. Similar to the modified ray tracing technique performed during the interactive phase, the modified ray tracing performed during the refinement phase 206 may include a subset of operations of a full ray tracing technique or perform a different set of operations. Further, the full ray tracing technique or modification thereof may be selectable by a user. For example, a user could select to use a modified ray tracing technique during the refinement phase 206 if greater rendering speed is desired. Although described herein primarily with respect to the refinement phase 206 beginning after the interactive phase 204, in some embodiments, computations for the interactive phase 204 and the refinement phase 206 may be performed at the same time. For example, computations for the interactive phase 204 may be performed on a GPU, while computations for the refinement phase 206 are performed simultaneously on a CPU. More generally, computations for the interactive phase 204 and the refinement phase 206 may be performed separately or together on one or more CPUs, GPUs, and/or other processors. As another example, at least some computations during the interactive phase 204 may be a subset of the computations during the refinement phase 206. In some embodiments, the interactive editing application 130 may recycle the computations performed during the interactive phase 204 for the refinement phase 206, rather than starting the refinement phase 206 from scratch. However, in other embodiments, computations performed during the interactive phase 204 may not be re-used during the refinement phase 206, as doing so can be impractical and saves relatively little time (e.g., a fraction of a second).

If the user begins interacting with the virtual scene again during the refinement phase 206, then the interactive editing application 130 stops the refinement phase 206, discards any rendered results, and returns to the interactive phase 204 so that additional previews can be rendered to show the results of the latest user interactions.

Figure 3A:
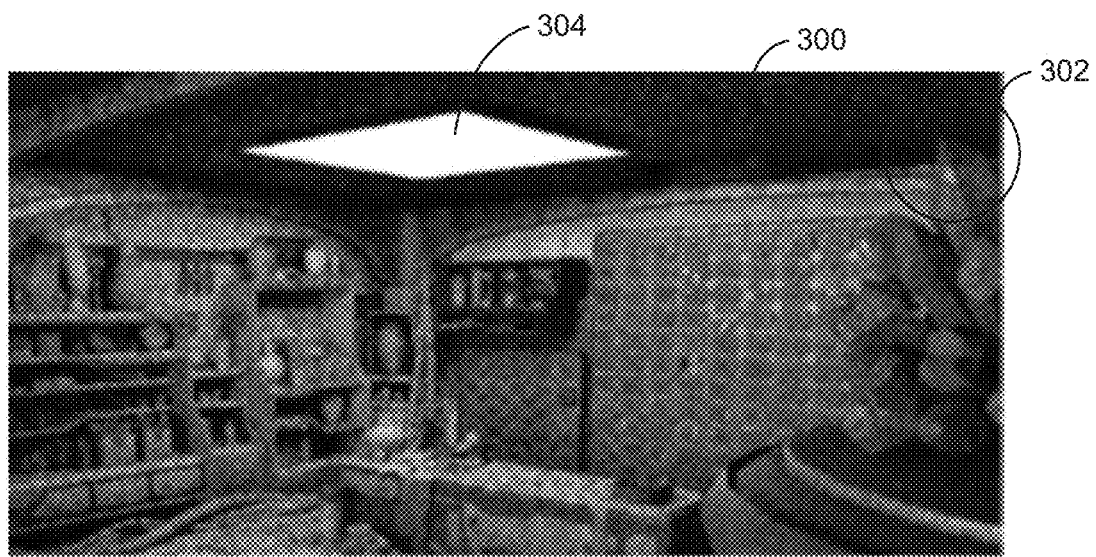
FIG. 3A illustrates an interactive phase of rendering a virtual scene, according to various embodiments.
Figure 3B:
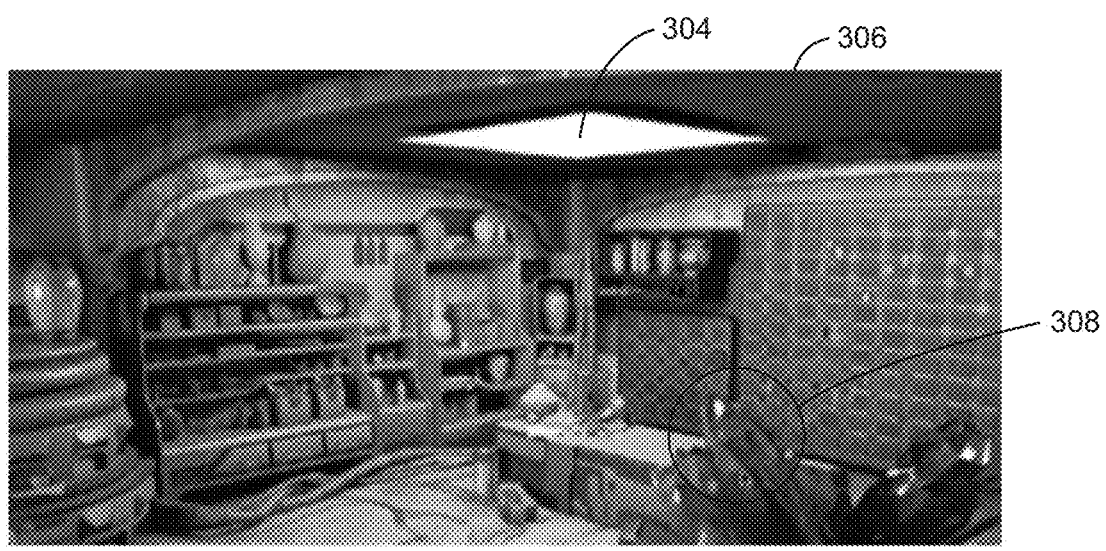
FIG. 3B illustrates a refinement phase of rendering a virtual scene, according to various embodiments.

FIGS. 3A and 3B illustrate interacting and refinement phases for rendering a virtual scene, respectively, according to various embodiments. As shown in FIG. 3A, when a user interacts with a virtual scene by tumbling a virtual camera to view different portions of the virtual scene, the interactive editing application 130 enters the interactive phase 204 and renders preview image frames (e.g., preview image frame 300) showing results of the user interactions with the virtual scene. As shown, indirect illumination effects are turned off during the rendering of the preview image frame 300. For example, a ceiling 304 in the virtual scene is completely black in the image frame 300. In addition, reflective properties of objects within the virtual scene are disabled during rendering of the image frame 300. For example, crystals within circle 302 are without reflective properties. The illustrated modification to ray tracing decreases the computational expense of rendering the image frame 300, permitting the image frame 300 to be rendered within a relatively short amount of time (e.g., a fraction of a second) so that interactive feedback can be provided to a user editing the virtual scene. As described, a modified ray tracing technique may perform only a subset of the operations of a full ray tracing technique, including operations that are necessary to guarantee the fidelity of desired aspects of rendered image frames, and the operations of a full ray tracing technique that are retained and/or omitted by a modified ray tracing technique may be user-selectable based on, e.g., a number of predefined rendering modes and associated options. As a result, users, such as the users in different departments of an animation studio, can configure the interactive editing application 130 to render preview image frames at fully interactive frame rates during the interactive phase 204, without compromising the quality of aspects of those image frames that are of interest to the users.

As shown in FIG. 3B, when a user stops interacting with the virtual scene, the interactive editing application 130 enters the refinement phase 206 During the refinement phase, the interactive editing application 130 performs a full ray tracing rendering to generate an image frame 306 that includes indirect illumination effects, and with the reflectance properties of objects enabled. As a result, the ceiling 304 in the scene has a blue-ish tint (due to indirect global illumination), crystals appear shiny, and there is illumination everywhere in the image frame 306, in contrast to the preview image frame 300. For example, crystals within circle 308 are rendered with reflective properties and appear shiny. That is, during the refinement phase 206, the interactive editing application 130 renders a high-quality image frame 306 with full global illumination, which requires relatively expensive ray tracing computations. The interactive editing application 130 can also display a visual transition between the interactive phase 204 and the refinement phase 206. Doing so presents a smooth on-screen transition between the interactive phase 204 and the refinement phase 206 to the user. For example, in some embodiments, the interactive editing application 130 can interpolate the dynamic image produced during the interactive phase 204 into the dynamic image produced during the refinement phase 206 over time (e.g., half a second), render samples from the refinement phase 206 on top of the dynamic image produced during the interactive phase 204 as the samples become available, or a combination of both. In addition, the interactive editing application 130 can stop the refinement phase 206, discard any rendered results, and return to the interactive phase 204, if the user interacts again with the virtual scene, as described above.

Although a rendered result of the refinement phase 206 is shown for illustrative purposes, it should be understood that pixels may come in relatively slowly (e.g., over the course of minutes) during the refinement phase 206, as the full ray tracing technique is relatively computationally expensive. However, in contrast to conventional ray tracing approaches to providing interactive feedback, the full ray tracing technique does not require progressive rendering or produce blocky image frames. In some embodiments, a user may select a faster approximation to a full ray tracing technique if the user is not interested in certain aspects of the rendered image frame. That is, similar to the interactive phase 204, the interactive editing application 130 may permit a user to select a modified ray tracing technique for the refinement phase 206.

Figure 4:
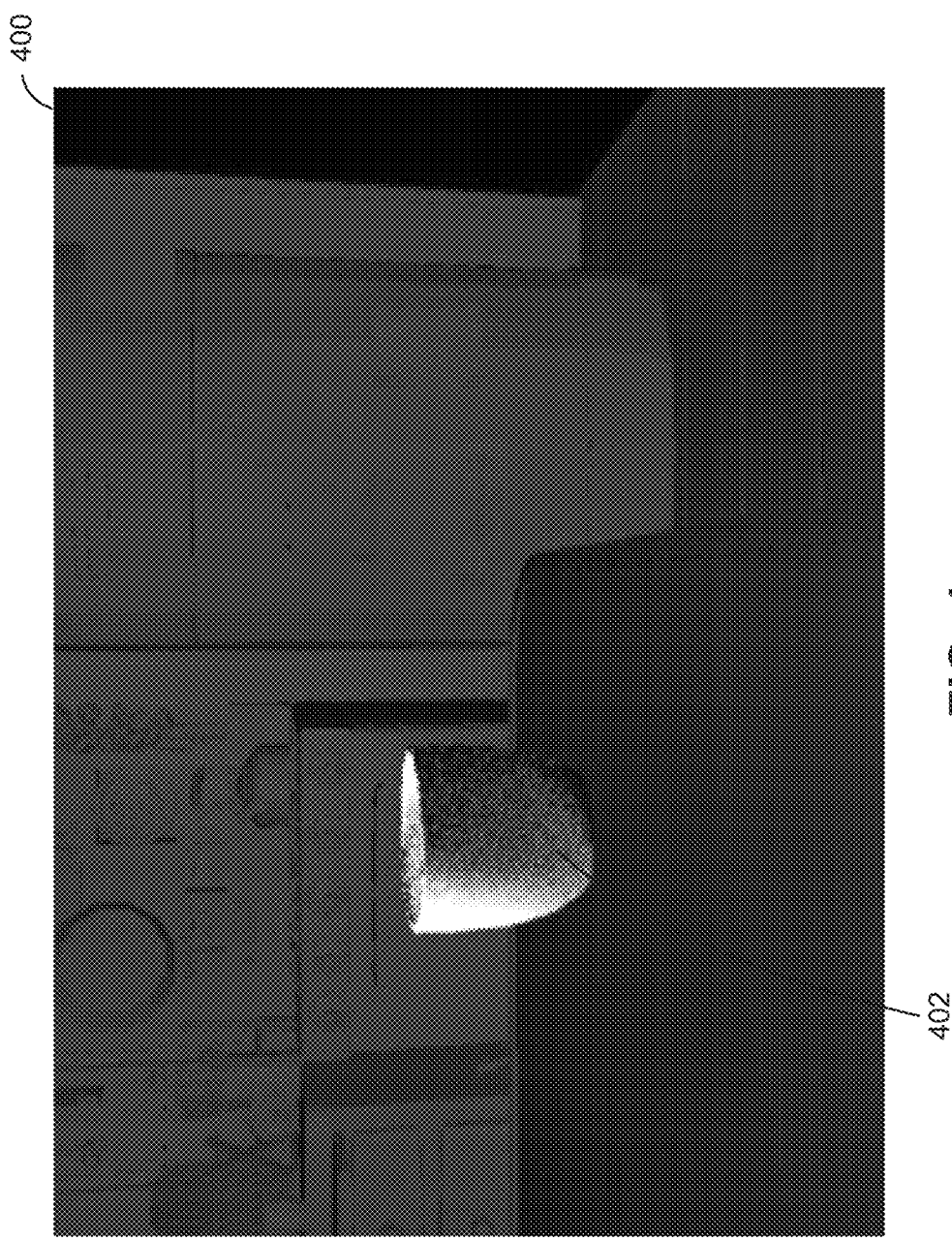
FIG. 4 illustrates an interactive rendering phase during which a user interacts with an object, according to various embodiments.

FIG. 4 illustrates an interactive rendering phase during which a user interacts with an object, according to various embodiments. As shown, a user has interacted with a cup 402 in a virtual scene. In response, the interactive editing application 130 enters the interactive phase 204 and renders a preview image frame 400 based on the user interaction with the cup 402. As described, user interactions that trigger the interactive phase 204 may include selecting, moving, adding, deleting, and/or changing the attributes of one or more objects, light sources, and/or virtual cameras within a virtual scene. For example, a user could select the cup 402 and reassign a shader associated with the cup. Other examples of user interactions with an object including repositioning the object, changing a color of the object, changing material surface properties of the object (using, e.g., sliders), etc.

During user interactions with the cup 402, the interactive editing application 130 renders the preview image frame 400 using a modified ray tracing technique in which (1) full ray tracing, including full shading and full illumination steps thereof, is performed for the cup 402, and (2) other objects within the virtual scene are rendered with full geometric fidelity but no shading or illumination. In some embodiments, computations during the interactive phase 204 may be performed simultaneously on multiple processors. For example, a full ray tracing technique may be performed using a CPU for the cup 402, while a ray tracing technique that preserves only geometric fidelity for other objects may be performed using a GPU at the same time.

The foregoing modified ray tracing technique assumes that the user interacting with the cup 402 is focused on the cup 402 and less interested in other objects within the virtual scene. For example, the user in a look development department of an animation studio may be responsible for the look of objects in virtual scenes and need to see accurate material responses, including reflectance, for specific objects, but such a user may be less concerned with the rest of the rendered environment.

More generally, a full ray tracing technique simulates the path that light takes as the light bounces within a virtual 3D scene, with certain computations being performed at each such bounce. As described, a modified ray tracing technique may perform a subset of the operations of a full ray tracing technique, including operations that are necessary to guarantee the fidelity of desired aspects of rendered image frames. In some embodiments, modifications to a full ray tracing technique may include limiting the computations performed at each bounce and/or limiting the number of bounces (which are also sometimes referred to as "path segments") of light rays. For example, path tracing is a ray tracing technique that fires light rays into a virtual scene from camera(s). In path tracing, the intersections of light rays with scene geometry may be determined and used to render objects with full geometric fidelity, such as objects other than the cup 402 in the preview image frame 400. In rendering the objects other than the cup 402, the interactive editing application 130 stops after traced light rays intersect scene geometry, without performing further computations to determine, e.g., the color, texture, shading, illumination, shadows, and/or volume of objects, and without tracing the light rays through additional bounces. As a result, the geometry of the objects other than the cup 402 is rendered with basic shading and simple illumination. Although path tracing is described herein as a reference example, techniques disclosed herein are also applicable to other types of ray tracing.

In contrast to the rendering of the other objects, the rendering of the cup 402 during the interactive phase 204, as well as the rendering of the entire virtual scene during the refinement phase 206 after the user stops interacting with the virtual scene, uses a full ray tracing technique. Continuing the example of path tracing, after a light ray intersects scene geometry, the full path tracing technique includes sampling a texture on the surface of the scene geometry to determine a parameter used in shader evaluation, such as color or roughness. The interactive editing application 130 may further fire a light ray towards a probabilistically chosen light source in order to determine the shadowing and illumination at the point of intersection with the scene geometry. Additional computations include shading and volume rendering operations, if appropriate. In addition, the interactive editing application 130 may construct a bidirectional reflectance distribution function (BRDF) that defines how light reflects at the surface of the scene geometry, and use the BRDF to sample a direction for a new light ray that is fired along such a direction away from the surface of the scene geometry. The new light ray may thereafter intersect another piece of scene geometry, and the foregoing process may be repeated until a given number of bounces of the light ray have been computed.

Within each such bounce, a modified path tracing technique that is performed during the interactive phase 204 may remove and/or simplify any computations of a full path tracing technique that are not geometry computations. For example, the modified ray tracing technique could include illumination and shadow computations but omit the shading operation at each bounce. Shading in production scenes is typically a very compute-intensive operation. Texture look-ups are one sub-component of performing a single shading operation, which can require an arbitrary number of texture look-ups and other complex mathematical calculations, such as calculations to combine the results of texture look-ups. In the case where illumination and shadow computations are performed but the shading operation is omitted, the rendered image frame would include illumination and shadows, but all objects within the virtual scene would be gray. It should be noted that illumination and shadows may also be turned on and off independently in some embodiments. As another example, the modified ray tracing technique could omit shadow computations and the shading operation at each bounce, but determine the roughness of the surface of scene geometry that a light ray has intersected so that the surface can be rendered with appropriate shininess. As an additional example, the modified ray tracing technique could omit volume rendering. In the case of a volume such as smoke or a cloud, volume rendering would otherwise be used to determine an amount of light attenuated by the volume at each bounce of a light ray and scattering of light within the volume. Omitting such volume rendering can speed up rendering during the interactive phase 204, but volumes such as smoke or clouds are removed from the rendered image frame.

Figure 5:
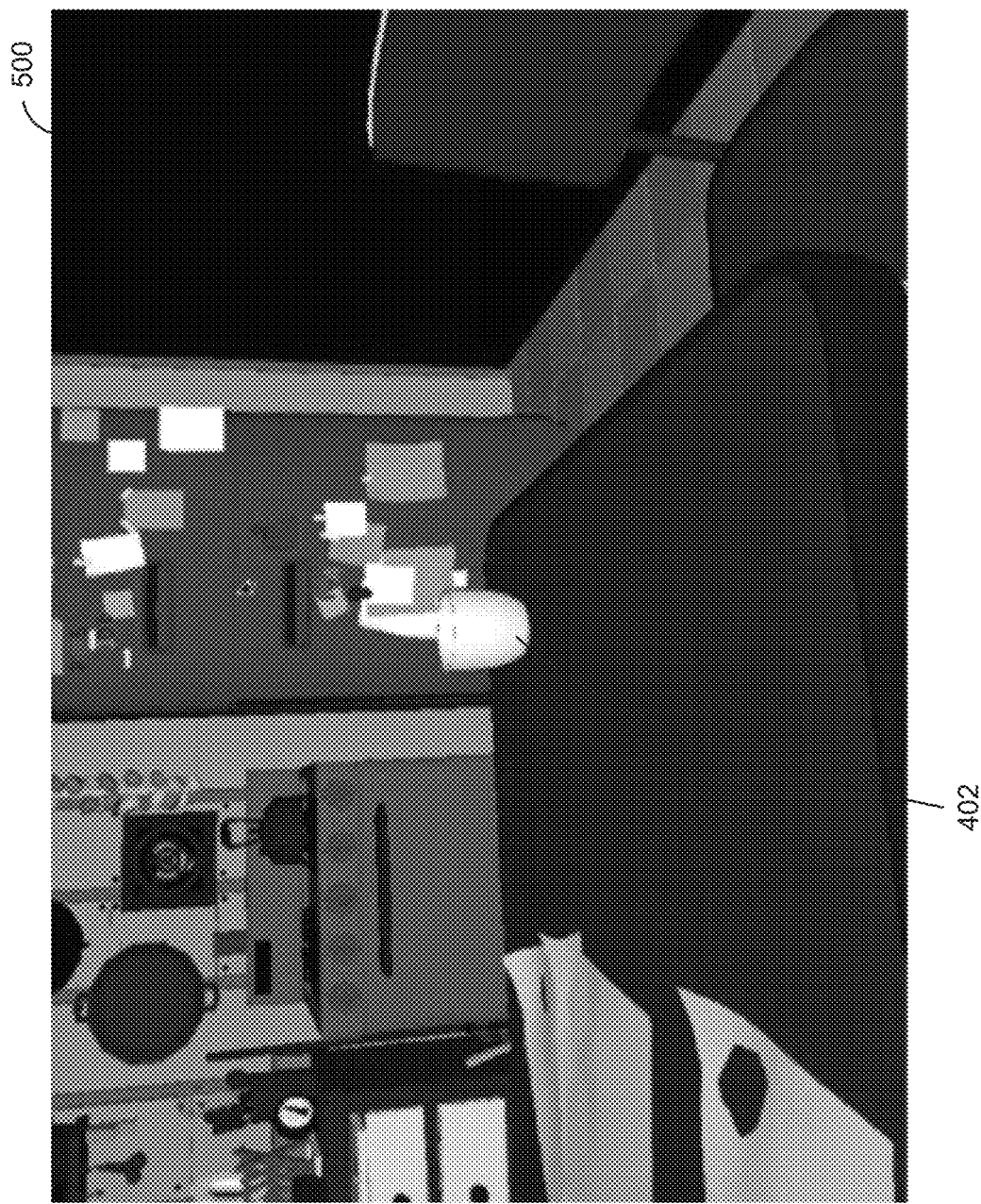
FIG. 5 illustrates an interactive rendering phase during which objects are rendered with base colors, according to various embodiments.

As another example, the modified path tracing technique could only guarantee geometric fidelity and perform a texture look-up to determine the base colors of the surfaces of scene geometry. A base color is one of the textures that can be applied to the surface of an object within a virtual scene. FIG. 5 illustrates an interactive rendering phase during which objects are rendered with base colors, according to various embodiments. As shown, the cup 402 has been rendered in an image frame 500 with its base color of white, while other scene objects have been rendered with their associated base colors. However, in this example, the modified ray tracing algorithm does not perform shading, illumination, shadows, or volume computations at each bounce of light, thereby reducing computational expense during the interactive phase 204.

Although determining base colors of the surfaces of scene geometry is described herein as a reference example, more generally, any simplification or omission of shading, texture, illumination, shadow, and/or volume rendering computations at each bounce may be made during the interactive phase 204. As described, a shader evaluation, which may include a texture look-up and other computations, can be complex and computationally expensive. In some embodiments, such an evaluation may be simplified or omitted in any technically feasible manner. For example, if the user does not care about the color of an object and is only interested in the illumination or bumpiness/roughness of the object, then the shading computation could be simplified by disabling surface reflectance properties of the object and simply determining where light(s) are relative to the objects. As another example, if the user is interested in how light bounces off of an object, then the shading computation could be configured to approximate surface reflectance. As described, the interactive editing application 130 may permit a user to select among different predefined rendering modes, which may be associated with various departments within an animation studio, as well as different options for the selected rendering mode, in order to choose a modification to ray tracing that provides the desired trade-off between rendering time and quality of relevant aspects (e.g., geometry, texture, illumination, shading, and/or volume) of a rendered image frame that are of interest to the user.

Figure 6:
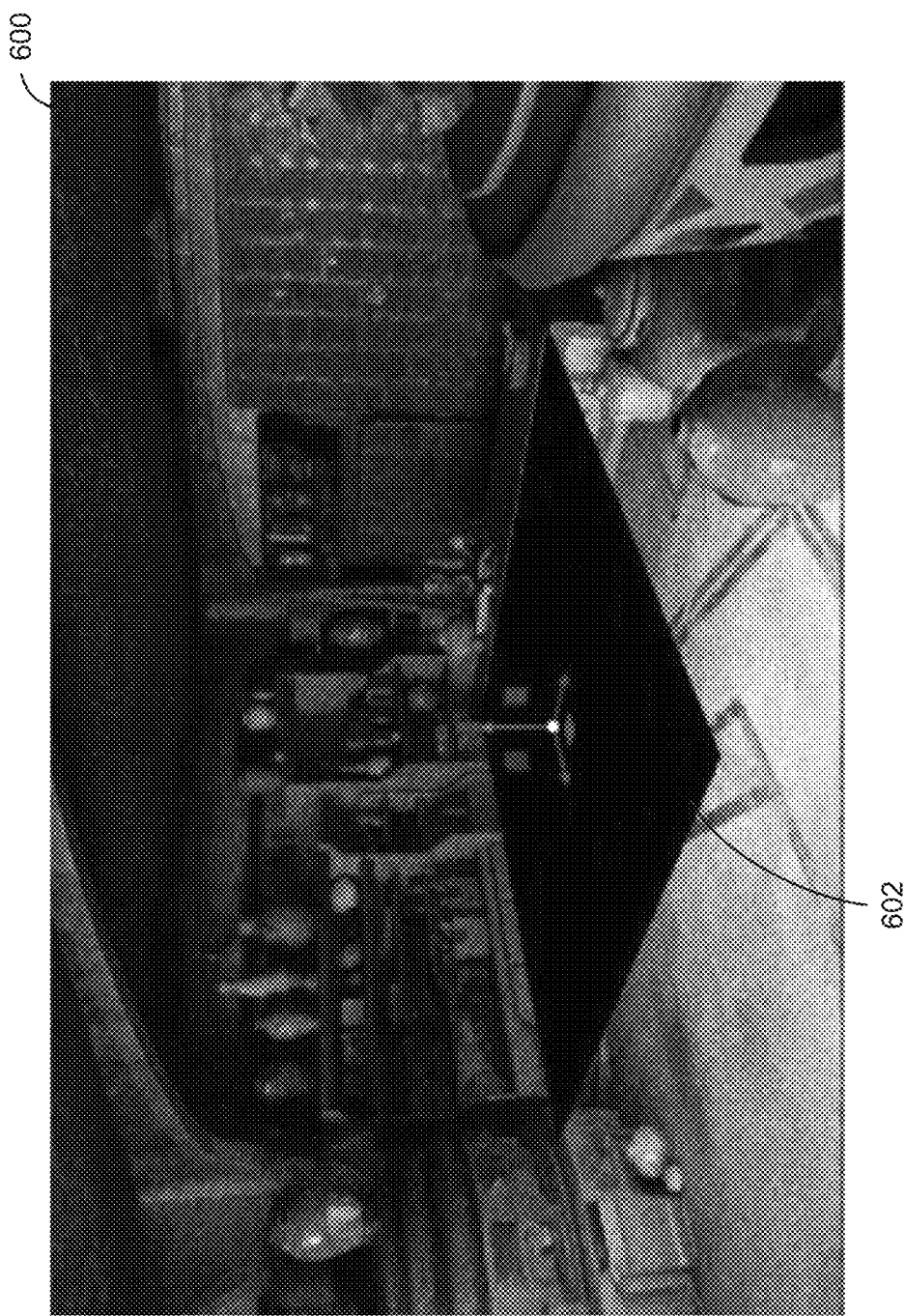
FIG. 6 illustrates an interactive rendering phase during which a user interacts with a light source, according to various embodiments.

As yet another example of modifications to a path tracing technique during the interactive phase 204, the interactive editing application 130 may permit a user to select a modified path tracing technique that only computes illumination and shadows from one or more light sources with which a user is interacting, while ignoring other light sources within a virtual scene. FIG. 6 illustrates an example of such an interactive rendering phase during which a user interacts with a light source, according to various embodiments. As shown, a user has interacted with the light source 602 by selecting and moving the light source 602 with respect to the location of the light source 602 in FIGS. 3A-3B. Other examples of interactions with a light source include creating a light source, removing a light source, repositioning a light source, and changing an attribute of a light source such as an intensity of light emitted by the light source or a cone angle of a spot light source.

As shown, the interactive editing application 130 renders an image 600 during the interactive phase 204 by performing a modified ray tracing technique in which only illumination and shadows from the light source 602 is computed, such that the user interacting with the light source 602 only sees light and shadows created by the light source 602. In such a case, the interactive editing application 130 only traces shadows for the light source 602, while ignoring the shadows of other light sources within the virtual scene. That is, an accurate shadow preview is provided for only the light source 602 that the user interacts with. Although described with respect to one light source 602 as a reference example, a user may generally interact with any number of light sources, and the interactive editing application 130 may perform a modified ray tracing technique in which only illumination and shadows for such light sources are computed. Similar to the discussion above with respect FIGS. 2-5, the modification to the ray tracing technique that is used to render the image 600 may be selected by a user from among, e.g., a number of predefined rendering modes and/or options associated with those rendering modes. For example, users in a lighting department of an animation studio, who are responsible for placing lights in an unlit scene, need to see the illumination and shadows created by those lights, and such users could select a rendering mode that shows the illumination and shadows associated with selected light sources.

Figure 7:
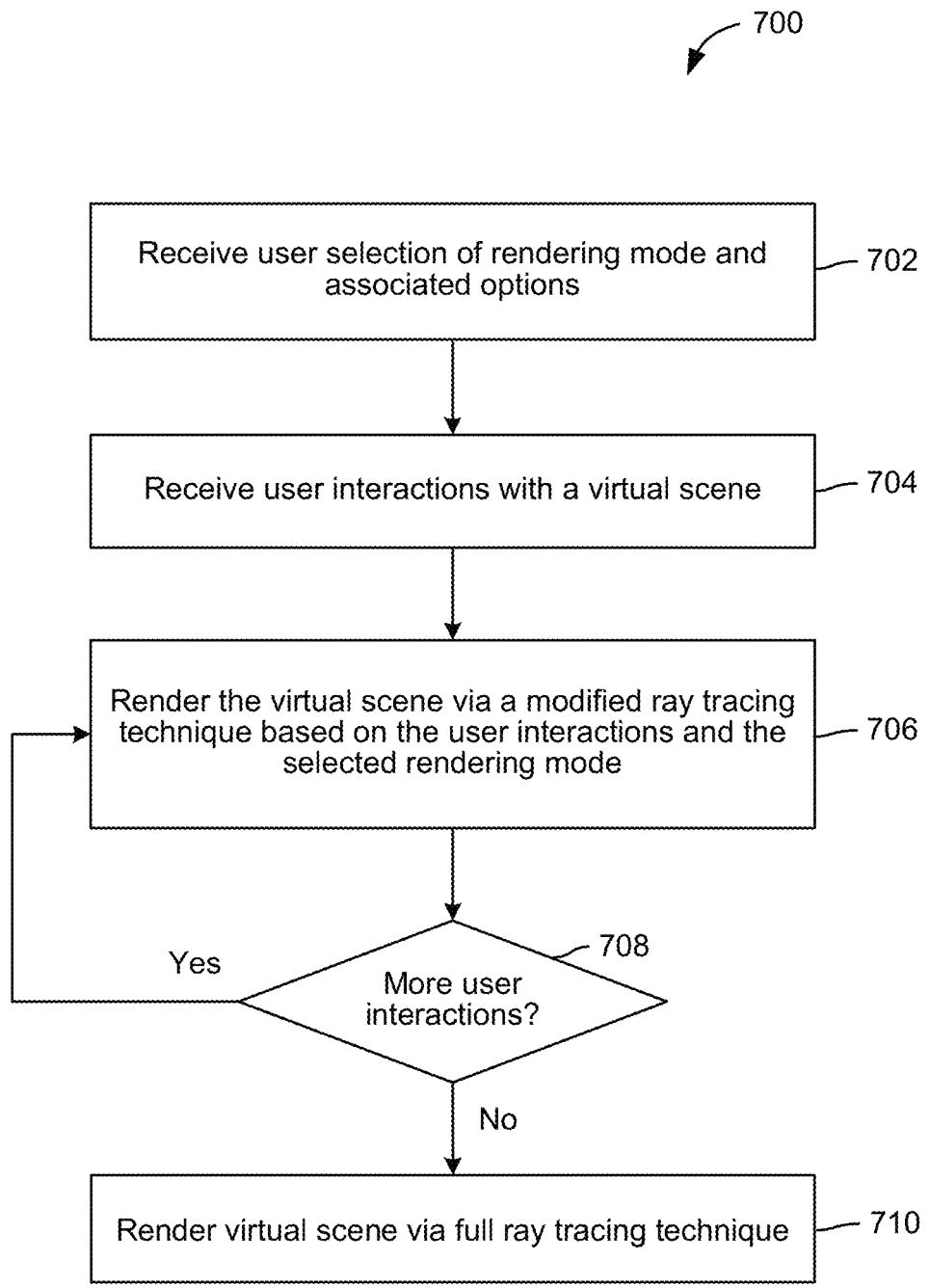
FIG. 7 sets forth a flow diagram of method steps for interactive editing of a virtual scene, according to various embodiments.

FIG. 7 sets forth a flow diagram of method steps for interactive editing of a virtual scene, according to various embodiments. Although the method steps are described in conjunction with the system of FIG. 1, persons of ordinary skill in the art will understand that any system configured to perform the method steps, in any order, is within the scope of the present invention.

As shown, a method 700 begins at step 702, where the interactive editing application 130 receives a user selection of a rendering mode and associated options. As described, the user may select among a number of predefined rendering modes and associated options to guarantee the fidelity of certain aspects of a rendered image frame (e.g., geometry, texture, shading, etc.) that are of interest to the user, but not others. Further, in some embodiments, each rendering mode may be associated with a corresponding department of an animation studio. In alternative embodiments, the interactive editing application 130 may permit a user to select options for modifying a full ray tracing technique (e.g., manually select one or more aspects of interest from a menu, list, or the like), without requiring the selection of a predefined rendering mode.

At step 704, the interactive editing application 130 receives user interactions with a virtual scene. As described, the user interactions may include any technically feasible edits made by a user to the virtual scene, such as selecting, moving, adding, deleting, and/or changing the attributes of one or more objects, light sources, and/or virtual cameras within the virtual scene.

At step 706, the interactive editing application 130 renders the virtual scene via a modified ray tracing technique based on the user interactions and the selected rendering mode. Step 706 is the interactive phase 204 rendering that prioritizes speed in order to provide quick feedback to a user interacting with the virtual scene. As described, the rendering mode may be selected so as to guarantee the fidelity of certain aspects of the rendered image frame that are of interest to the user, but not others.

At step 708, the interactive editing application 130 determines whether user interactions with the scene have ended. If user interactions with the scene have not ended, then the method 700 returns to step 706, where the interactive editing application 130 continues rendering the virtual scene via the ray tracing technique that is the modification of the full ray tracing technique based on additional user interactions.

On the other hand, if user interactions with the scene have ended, then at step 710, the editing application renders the virtual scene via a full ray tracing technique. Step 710 is the refinement phase 206 rendering that permits a user to see the final rendered image frame. However, if the user begins interacting with the virtual scene again, then the interactive editing application 130 stops the refinement phase 206, discards any rendering results, and returns to the interactive phase 204 during which the interactive editing application 130 renders the virtual scene again via the modified ray tracing technique, at step 706.

In sum, techniques are disclosed for interactive editing of virtual 3D scenes. In the disclosed techniques, rendering is divided into (1) an interactive phase during which a user interactively edits a virtual scene while preview image frames are rendered using a modified ray tracing technique, and (2) a refinement phase during which full ray tracing is performed to show the user a final rendered image frame. The modified ray tracing technique may limit the number of bounces of light rays and/or the computations performed at each bounce, thereby reducing computational expense relative to a full ray tracing technique. Further, the modified ray tracing technique may be user-selectable and associated with a particular department within an animation studio. In particular, a user may select among different predefined rendering modes associated with the departments within the animation studio, as well as different options for a selected rendering mode. Each rendering mode is associated with a modified ray tracing technique guaranteeing the fidelity of certain aspects (e.g., geometry, texture, illumination, shading, and/or volume) of a rendered image frame that may be of interest to a user.

At least one technical advantage of the disclosed techniques relative to the prior art is that the disclosed techniques enable a user to select various modifications to a ray tracing technique in order to reduce overall rendering times while maintaining visual quality with respect to aspects of the rendered image frames most relevant to the user. Further, the rendering process is divided into an interactive phase that allows users to interactively edit virtual scenes using various modified ray tracing techniques and a refinement phase that implements full ray tracing to provide full quality image frames. During the interactive phase, preview renderings are generated within a limited amount of time, in contrast to traditional ray tracing techniques that can be quite computationally expensive. Thus, the disclosed techniques provide accurate final-frame results, more interactive workflows, and tighter feedback loops that allow artists to better assess the effects their edits have on rendered image frames compared to prior art approaches. These technical advantages represent one or more technological improvements over prior art approaches.

1. Some embodiments include a computer-implemented method for creating a rendered image frame, the method comprising determining one or more user interactions with a virtual scene, rendering the virtual scene via a first ray tracing technique, wherein the first ray tracing technique is applied to the virtual scene based on the one or more user interactions, and after rendering the virtual scene via the first ray tracing technique, rendering the virtual scene via a second ray tracing technique.

2. The computer-implemented method according to clause 1, wherein the first ray tracing technique comprises a subset of ray tracing operations included in the second ray tracing technique.

3. The computer-implemented method according to clauses 1 or 2, wherein the subset of ray tracing operations is based on a user selection of at least one option included in a plurality of options for modifying the second ray tracing technique.

4. The computer-implemented method according to any of clauses 1-3, further comprising determining that a user has stopped interacting with the virtual scene prior to rendering the virtual scene via the second ray tracing technique.

5. The computer-implemented method according to any of clauses 1-4, wherein the first ray tracing technique only enables fidelity of at least one of geometry, textures, illumination, shadows, shading, or volumes within the virtual scene to be maintained during rendering relative to the second ray tracing technique.

6. The computer-implemented method according to any of clauses 1-5, wherein the first ray tracing technique limits at least one of a number of bounces of light rays within the virtual scene or a number of computations performed for each bounce of a light ray within the virtual scene.

7. The computer-implemented method according to any of clauses 1-6, wherein the first ray tracing technique renders geometry of at least one object in the virtual scene with which a user is not interacting with more basic shading and simpler illumination relative to geometry of at least one object in the virtual scene with which the user is interacting.

8. The computer-implemented method according to any of clauses 1-7, wherein the first ray tracing technique renders one or more shadows based on only one or more light sources with which a user is interacting.

9. The computer-implemented method according to any of clauses 1-8, wherein the one or more user interactions include at least one of selecting, moving, adding, deleting, or changing an attribute of at least one of an object, a light source, or a virtual camera within the virtual scene.

10. The computer-implemented method according to any of clauses 1-9, wherein the first ray tracing technique is associated with a user-selected rendering mode included in a plurality of predefined rendering modes, and each predefined rendering mode included in the plurality of predefined rendering modes is customized for an associated department of an animation studio.

11. Some embodiments include a non-transitory computer-readable storage medium including instructions that, when executed by one or more processors, cause the one or more processors to perform steps for creating a rendered image frame, the steps comprising determining one or more user interactions with a virtual scene, rendering the virtual scene via a first ray tracing technique, wherein the first ray tracing technique is applied to the virtual scene based on the one or more user interactions, and after rendering the virtual scene via the first ray tracing technique, rendering the virtual scene via a second ray tracing technique.

12. The computer-readable storage medium according to clause 11, wherein the first ray tracing technique comprises a subset of ray tracing operations included in the second ray tracing technique.

13. The computer-readable storage medium according to clauses 11 or 12, the steps further comprising determining that a user has stopped interacting with the virtual scene prior to rendering the virtual scene via the second ray tracing technique.

14. The computer-readable storage medium according to any of clauses 11-13, wherein the first ray tracing technique only enables fidelity of at least one of geometry, textures, illumination, shadows, shading, or volumes within the virtual scene to be maintained during rendering relative to the second ray tracing technique.

15. The computer-readable storage medium according to any of clauses 11-14, wherein the first ray tracing technique limits at least one of a number of bounces of light rays within the virtual scene or a number of computations performed for each bounce of a light ray within the virtual scene.

16. The computer-readable storage medium according to any of clauses 11-15, wherein limiting the number of computations performed for each bounce of the light ray comprises omitting at least one of texture, illumination, shadows, shading, or volume computations at each bounce of the light ray.

17. The computer-readable storage medium according to any of clauses 11-16, wherein the first ray tracing technique renders geometry of at least one object in the virtual scene with which a user is not interacting with more basic shading and simpler illumination relative to geometry of at least one object in the virtual scene with which the user is interacting.

18. The computer-readable storage medium according to any of clauses 11-17, wherein the first ray tracing technique renders one or more shadows based on only one or more light sources with which a user is interacting.

19. The computer-readable storage medium according to any of clauses 11-18, the steps further comprising, responsive to receiving one or more additional user interactions with the virtual scene, rendering, via the first ray tracing technique, the virtual scene based on the one or more additional user interactions.

20. Some embodiments include a system comprising a memory storing an application, and one or more processors that are coupled to the memory and, when executing the application, are configured to perform operations for creating a rendered image frame, the operations comprising determining one or more user interactions with a virtual scene, rendering the virtual scene via a first ray tracing technique, wherein the first ray tracing technique is applied to the virtual scene based on the one or more user interactions, and after rendering the virtual scene via the first ray tracing technique, rendering the virtual scene via a second ray tracing technique.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for creating a rendered image frame, the method comprising:
   determining one or more user interactions with a virtual scene;
   rendering the virtual scene via a first ray tracing technique based on the one or more user interactions; and
   rendering the virtual scene via a second ray tracing technique.

2. The computer-implemented method of claim 1, wherein the first ray tracing technique comprises a subset of ray tracing operations included in the second ray tracing technique.

3. The computer-implemented method of claim 1, wherein at least one ray tracing operation included in the first ray tracing technique is based on a user selection of at least one option for modifying the second ray tracing technique.

4. The computer-implemented method of claim 1, wherein the first ray tracing technique enables fidelity of at least one of geometry, textures, illumination, shadows, shading, or volumes within the virtual scene.

5. The computer-implemented method of claim 1, wherein the first ray tracing technique limits at least one of a number of bounces of light rays within the virtual scene or a number of computations performed for each bounce of a light ray within the virtual scene.

6. The computer-implemented method of claim 1, wherein the first ray tracing technique renders geometry of a first object in the virtual scene with at least one of more basic shading or simpler illumination relative to geometry of a second object in the virtual scene, wherein a user is not interacting with the first object and the user is interacting with the second object.

7. The computer-implemented method of claim 1, wherein the first ray tracing technique renders one or more shadows based on one or more light sources with which a user is interacting.

8. The computer-implemented method of claim 1, further comprising determining that a user has stopped interacting with the virtual scene prior to rendering the virtual scene via the second ray tracing technique.

9. The computer-implemented method of claim 1, wherein the virtual scene is rendered via the second ray tracing technique after the virtual scene is rendered via the first ray tracing technique.

10. One or more non-transitory computer-readable media including instructions that, when executed by one or more processors, cause the one or more processors to perform the steps of:
    determining one or more user interactions with a virtual scene;
    generating fast preview renderings of the virtual scene based on the one or more user interactions; and
    rendering the virtual scene via a second ray tracing technique.

11. The one or more non-transitory computer-readable media of claim 10, wherein the fast preview renderings are generated using a subset of ray tracing operations included in the ray tracing technique.

12. The one or more non-transitory computer-readable media of claim 10, wherein the fast preview renderings are associated with fidelity of at least one of geometry, textures, illumination, shadows, shading, or volumes within the virtual scene.

13. The one or more non-transitory computer-readable media of claim 10, wherein the fast preview renderings are generated using another ray tracing technique that limits at least one of a number of bounces of light rays within the virtual scene or a number of computations performed for each bounce of a light ray within the virtual scene.

14. The one or more non-transitory computer-readable media of claim 10, wherein the virtual scene is rendered, at least in part, via the ray tracing technique while the fast preview renderings are is being generated.

15. The one or more non-transitory computer-readable media of claim 10, wherein the fast preview renderings are generated based on a user-selected rendering mode.

16. The one or more non-transitory computer-readable media of claim 10, wherein the fast preview renderings are generated based on a rendering mode that has been customized for a department of an animation studio.

17. The one or more non-transitory computer-readable media of claim 10, wherein the one or more user interactions comprise at least one of selecting, moving, adding, deleting, or changing an attribute of at least one of an object, a light source, or a virtual camera within the virtual scene.

18. The one or more non-transitory computer-readable media of claim 10, wherein a first set of rays is traced within the virtual scene during generation of the fast preview renderings, and a second set of rays that is different from the first set of rays is traced within the virtual scene when implementing the ray tracing technique.

19. The one or more non-transitory computer-readable media of claim 10, wherein image frames are rendered at a first frame rate when generating the fast preview renderings and when rendering the virtual scene via the ray tracing technique.

20. A system, comprising:
    one or more memories storing instructions; and
    one or more processors that are coupled to the one or more memories and, when executing the instructions, are configured to perform the steps of:
    determining one or more user interactions with a virtual scene; and
    rendering the virtual scene via a ray tracing technique based on the one or more user interactions to generate fast preview renderings of the virtual scene.

* * * * *

UNITED STATES PATENT AND TRADEMARK OFFICE
CERTIFICATE OF CORRECTION

PATENT NO. : 11,847,731 B2
APPLICATION NO. : 18/052534
DATED : December 19, 2023
INVENTOR(S) : Yining Karl Li, Mark Lee and Daniel Teece It is certified that error appears in the above-identified patent and that said Letters Patent is hereby corrected as shown below:

In the Claims

Column 18, Claim 14, Line 23, please delete "is".

Signed and Sealed this
Thirteenth Day of February, 2024

Katherine Kelly Vidal
*Director of the United States Patent and Trademark Office*